United States Patent

[11] 3,608,845

[72] Inventors Isao Kozu; Yukitada Ayukawa, both of Osaka-fu, Japan
[21] Appl. No. 868,703
[22] Filed Oct. 23, 1969
[45] Patented Sept. 28, 1971
[73] Assignee Matsushita Electric Industrial Co., Ltd. Kadoma, Osaka, Japan
[32] Priority Oct. 29, 1968, Oct. 29, 1968
[33] Japan
[31] 43/80178 and 43/80188

[54] TAPE END DETECTING DEVICE FOR TAPE RECORDER

6 Claims, 7 Drawing Figs.

[52] U.S. Cl. .......... 242/186, 242/57
[51] Int. Cl. .......... B65h 59/38, G03b 1/04, G11b 15/32
[50] Field of Search .......... 242/57, 191, 186, 208–210

[56] References Cited

UNITED STATES PATENTS 3,285,525 11/1966 Buckler .......... 242/187
3,480,230 11/1969 Hosono et al. .......... 242/191

*Primary Examiner*—Leonard D. Christian
*Attorney*—Wenderoth, Lind & Ponack

ABSTRACT: A tape end detecting device for a tape recorder comprising a follower member biased by a tape reel roller member against a cam formed integrally with a motor driven fly wheel so that when transport of the tape is completed the follower is engaged by an activating member also integral with the fly wheel so as to unlatch an associated control member and restore the tape transport to its original stop condition.

INVENTORS

ISAO KOZU
YUKITADA AYUKAWA

BY Wenderoth, Lind & Ponack
ATTORNEYS

INVENTORS
ISAO KOZU
YUKITADA AYUKAWA

BY Wenderoth, Lind & Ponack
ATTORNEYS

TAPE END DETECTING DEVICE FOR TAPE RECORDER

The present invention relates to a tape recorder and more particularly to a tape recorder capable of detecting the termination of movement of a tape.

In conventional tape recorders, various attempts have been made to detect the termination of movement of a tape. For example, some of the commercially available tape recorders are provided with a shutoff switch which is adapted to be actuated when the tape moves away from a predetermined tape path. Others are provided with a sensing switch for detecting the presence of a metal foil which is adhered to the end portion of the tape. In above arrangements a solenoid must be used in order to bring the tape recorder to a completely stopped condition.

Recently new reel-to-reel-type cartridges, the so called cassettes, have become popular all over the world. An improved method has been proposed for the purpose of detecting the termination of the tape movement, which method is particularly useful in a cassette-type recorder. It employs a double-throw detection switch which is responsive to the rotation of a reel roller. In a cassette tape recorder, the reel rollers stop their rotation when the tape reaches the end of its movement because both ends of the tape are permanently affixed to reel hubs in the cassette. At the termination of rotation of the reel rollers, said detecting switch acts so as to energize a solenoid which acts to stop the tape recorder.

Such detecting devices as those described above have a comparatively high manufacturing cost because of the necessity of providing a solenoid which is more expensive than other mechanical components used in the tape recorder. In order to avoid using such an expensive solenoid, some tape recorders are provided with a tape end detecting device which functions to cut off the power supply for a motor and an amplifier. In this case, however, the tape driving mechanism remains in its position of operation for a long time if the operator forgets to return the controls of the tape recorder to the stopped condition. Therefore, a pressure roller in such a tape recorder will remain pressed in engagement with a capstan for a long period after the tape recorder terminates its operation. Consequently, the pressure roller will be given a permanent deformation at a portion of the periphery, which may cause an increase in wow and flutter when the pressure roller is again used to drive a tape.

Accordingly, an object of the present invention is to provide an improved tape recorder having a novel detecting device for mechanically detecting the termination of the movement of a tape.

Another object of the present invention is to provide an improved tape recorder having a novel detecting device for mechanically detecting the termination of the movement of a tape so as to cause the tape recorder and the controls therefor to return automatically to the stopped condition.

Still another object of the present invention is to provide an improved tape recorder having a novel detecting device which is inexpensive to make and reliable in its operation for mechanically detecting the termination of the movement of a tape.

A still further object of the present invention is to provide a tape recorder as described in the preceding paragraph with a novel device for protecting the tape recorder against an increase of wow and flutter upon further operation.

These objects are achieved by the tape recorder according to the present invention, which includes a first rotating member rotatable in association with the movement of a tape, a second rotating member driven by a motor, driving means on said second rotating member, actuating means rotatable in synchronism with said driving means, and follower means which is biased against said driving means by the rotation force of said first rotating member so as to follow said driving means. When the tape stops at the end thereof, the first rotating member stops, and the follower means remains out of engagement with said driving means. The second rotating member continues its rotation and brings said actuating means into engagement with said follower means.

Further objects and advantages of the invention will become apparent from the following detailed description taken in connection with the accompanying drawings in which.

FIGS. *4a*, *4b*, *4c* and *4d* are fragmentary schematic views of the detecting device for detecting the termination of movement of the tape.

Figure 1:
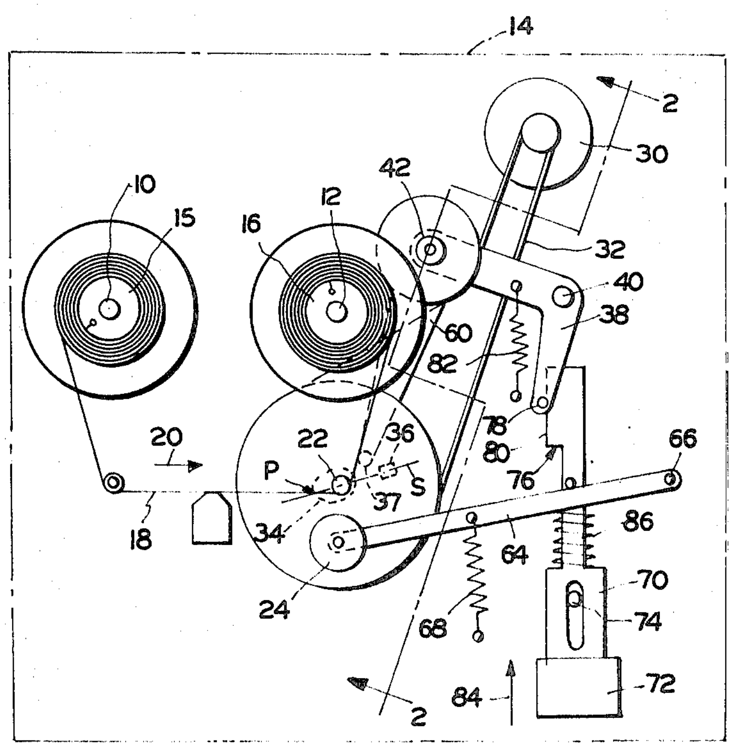
FIG. 1 is a schematic plan view of a tape recorder having the novel detecting device according to the present invention.
Figure 2:
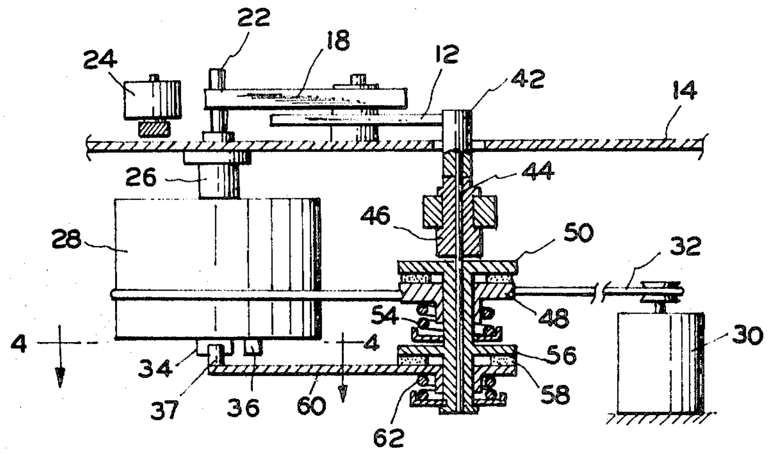
FIG. 2 is a sectional view of the tape recorder taken substantially along the line 2—2 of FIG. 1.

Referring now to the drawings, particularly FIG. 1 and FIG. 2, a supply reel roller 10 and a first rotating member in the form of a takeup reel roller 12 are rotatably mounted on a chassis 14. A pair of rotatable hubs 15 and 16 in a cartridge (not shown) can be engaged with said reel rollers 10 and 12, respectively when the cartridge is inserted into the tape recorder. The two ends of a magnetic tape 18 are permanently affixed to respective hubs 15 and 16.

The tape 18 can be moved in the direction of arrow 20 by a capstan 22 and a pressure roller 24 when the tape recorder is placed in the play condition or record condition. The capstan 22 is rotatably mounted in a bearing 26 attached to the lower surface of said chassis 14, and has a second rotatable member in the form of a flywheel 28 secured to the lower portion thereof. Said flywheel 28 is rotated from a motor 30 by an endless belt 32 extending around the flywheel 28 and the motor pulley, and is rotated at a lower speed and a comparatively greater torque than the motor.

The takeup reel roller 12 is frictionally rotated in the counterclockwise direction in the figures by a first slip mechanism which will be explained hereinafter, so as to wind the tape 18 on the takeup hub 16 when the tape recorder is in the play or record condition. Therefore, the takeup reel roller 12 rotates in association with the movement of the tape 18 which is driven by the cooperation of the capstan 22 and the pressure roller 24.

Said flywheel 28 is provided with a driving means in the form of a driving element 34 which is a cam formed integrally with the lower surface of said flywheel. The flywheel 28 is also provided with actuating means in the form of an actuating element 36 which is a pin secured to a lower surface of said flywheel. The relationship between the positions of said driving element 34 and said actuating element 36 is as follows: a summit point P, i.e., the maximum radius portion of said driving element 34, the center of the capstan 22 and the center of the actuating element 36 are aligned substantially in a straight line S. Said actuating element 36 is positioned on the opposite side of said summit point P, and a gap is left between the driving element 34 and the actuating element 36 large enough to allow a pin 37 to pass therethrough, as will be explained hereinafter.

As will be described presently in detail, said driving element 34 is adapted to be followed by follower means. An L-shaped lever 38 is pivotally mounted on a shaft 40 which is mounted on the chassis 14. Said lever 38 is provided with two slip mechanisms at one end portion thereof. As shown most clearly in Fig. 2, the first slip mechanism comprises a driving roller 42, a driven pulley 48, a first friction roller 50 and a compression spring 54. Said driving roller 42 is permanently affixed to a shaft 44 which is journaled in a bearing 46 supported on said L-shaped lever 38. Said driven pulley 48 is rotatably mounted on said shaft 44. Said first friction roller 50 is affixed to said shaft 44 and has a felt ring 52 adhered to the lower surface thereof. Said compression spring 54 presses said driven pulley 48 against said felt ring 52. Said driven pulley 48 is rotated by the endless belt 32 so that the driving roller 42 is frictionally driven through the first friction roller 50. The second slip mechanism comprises a second friction roller 56, a follower member 60 and a compression spring 62. Said second friction roller 56 is integrally formed with said first friction roller 50 and has a felt ring 58 adhered to the lower surface thereof. Said follower member 60 is swingably mounted on said shaft 44 and is pressed against said felt ring 58 by said compression spring 62. Said follower member 60 has an arm extending therefrom, at the end of which there is provided the aforementioned pin 37 engageable with the surface of said driving element 34.

An arm 64 is pivotally mounted on a shaft 66 and has the pressure roller 24 mounted on the free end thereof. The pressure roller 24 is opposed to the capstan 22 and is urged away from the capstan 22 by the biasing force of a spring 68 when the tape recorder is in its stopped condition as shown in Fig. 1. A sliding plate 70 having a play button 72 on one end thereof is slidably mounted on the chassis 14 and is guided by a guide pin 74, and is also provided with a cutaway portion 76. Said cutaway portion 76 is engageable with a pin 78 which is mounted on the other end of said L-shaped lever 38.

When the tape recorder is in its stopped condition as shown in Fig. 1, said pin 78 is pressed against an edge surface 80 on the sliding plate 70 by a spring 82 connected between the L-shaped lever and the chassis so that the driving roller 42 is spaced from the annular surface of the takeup reel roller 12.

When an operator presses the play button 72 in the direction of arrow 84 with the parts of the tape recorder in the positions as shown in Fig. 1, the pressure roller 24 is pressed tightly against the capstan 22 by a compression spring 86 which is attached on the sliding plate 70.

Figure 3:
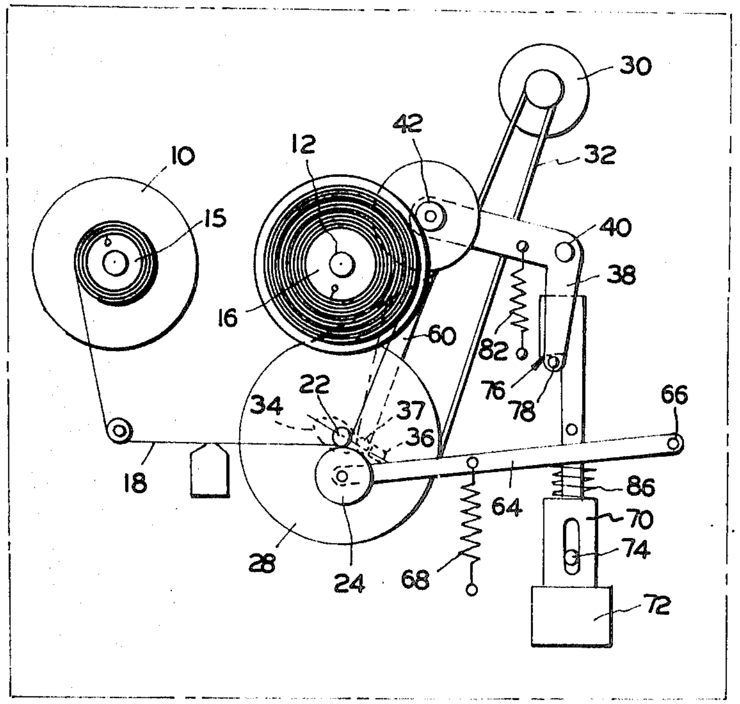
FIG. 3 is a schematic plan view of the tape recorder of FIG. 1, but with the parts in the playing condition.

The tape 18 moves in the direction of arrow 20 with the rotation of the capstan 22. At the same time, the movement of the sliding plate 70 moves the cutaway portion past the pin 78 so that the pin 78 falls into the cutaway portion 76 to the position as shown in Fig. 3. This allows the lever 38 to pivot counterclockwise due to the bias of the spring 82 so that the driving roller 42 engages with the takeup reel roller 12. Said takeup reel roller 12 is rotated counterclockwise by the driving roller 42 driven from the motor 30 through said first slip mechanism so as to wind the tape 18 on the hub 16. On the other hand, said sliding plate 70 is latched by the pin 78 in its operating position as shown in FIG. 3 so that the pressure roller 24 is kept pressed against the capstan 22 even if the operator removes his finger from the button 72.

With the lever 38 pivoted clockwise, the follower member 60 is in its first position as shown in Fig. 3 and is biased against the driving element 34 in a manner which will be explained in more detail hereinafter. Referring now to Fig. 2, the driving roller 42 is rotated through the frictional rotation force from the driven roller 48 unless the tape 18 stops its movement. Accordingly, the second friction roller 56 drives the follower member 60 under the frictional force produced by the felt ring 58. This causes the follower member 60 to rotate clockwise as seen in FIG. 3 so as to urge the pin 37 against the driving element 34. During the rotation of the flywheel 28, the driving element 34 moves the pin 37 so as to impart oscillating motion to the follower member 60 while it is in said first position. The pin 37 is not touched by the actuating element 36, because the gap between the driving element 34 and the actuating element is large enough to allow said pin 37 to pass therebetween as previously set forth.

When the tape 18 stops its movement when the end of the tape is reached, reel rollers 10 and 12 stop their rotation. Consequently, the driving roller 42 and the friction rollers 50, 56 stop their rotation despite the fact that the driven pulley 48 continues to be rotated.

Therefore, in the first slip mechanism, the slippage between the driven pulley 48 and the first friction roller 50 is greater than when the tape moves at the playing speed. In the second slip mechanism, the second friction roller 56 stops driving the follower member 60 so that said member 60 does not swing clockwise in Fig. 3.

Figure 4A:
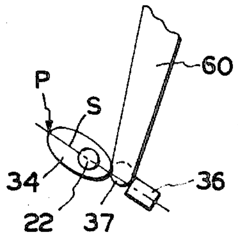
Figure 4B:
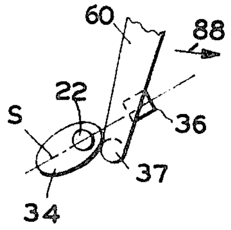
Figure 4C:
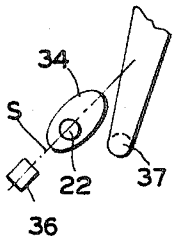
Figure 4D:
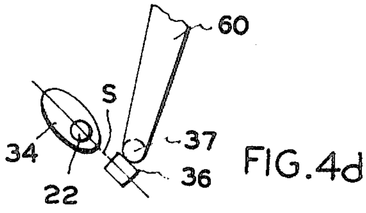

Suppose, for example, the follower member 60 occupies the position as shown in FIG. **4*a* when the takeup reel roller 12 stops its rotation at the termination of the movement of the tape. The follower member 60 is driven by the driving element 34 and is rotated to the direction of arrow 88 as shown in FIG. 4*b*. Said follower member 60 stops its motion at the extremity of the movement because the follower member 60 is not swung back any more by the friction roller 56, and the pin 37 is thus spaced from the driving element 34 as shown in FIG. 4*c*. When the flywheel 28 rotates further in the counterclockwise direction, the actuating element 36 is struck by the pin 37 as shown in FIG. 4*d*. This causes the follower member 60 to be displaced from its first position as shown in FIG. 3 to its second position as shown in FIG. 1, so that the L-shaped lever 38 rotates clockwise about the shaft 40. The sliding plate 70 is thereby unlatched from the pin 78 and the button 72 is restored to the original stop condition by the compression spring 86 as shown in FIG. 1. At the same time, the pressure roller 24 is moved away from the capstan 22 by the spring 68** and returns to its stop position.

It will be understood that this sequence of movements takes place whenever the pressure roller 24 stops.

Moreover, during the above described return motion to the stop condition, a switch for supplying electric power to the motor 30 can be automatically shut off by a slight modification in the structure.

In the embodiment described above, the first rotating member is in the form of the takeup reel roller 12. But it can be replaced by any rotating member which can rotate in accordance with the movement of the tape 18 and which will stop when the tape 18 stops, for instance, the supply reel roller 10 or a suitable roller in contact with the tape. Also, the second rotating member is in the form of the flywheel 28 in the above emobdiment, and the driving means and the actuating means are attached to said flywheel 28. This can be easily modified, for example by having the driving means and the actuating means attached to a suitable rotating member driven by said flywheel 28.

According to the embodiment described above, the play button 72 and the pressure roller 24 return to their stop positions when the movement of the tape is terminated. However, modifications can easily be made so that the actuating element intermittently hits the follower member to produce an alarm sound for informing the operator of the termination of tape movement. In addition, the tape end detecting device of the present invention can be effectively applied to a bidirectional tape recorder wherein the follower means of said device initiates an automatic tape reversing mechanism so as to change the direction of tape movement.

It is apparent that various modification may be made without departing from the invention. The above-described specific examples are intended merely to illustrate the various facets in certain selective embodiments of the invention, the scope of which it is intended shall be limited only by the following claims.

We claim:

1. In a tape recorder, the combination comprising: a first rotating member rotatable in association with the movement of a tape; a motor; a second rotating member coupled to and driven by said motor; driving means operatively associated with said second rotating member and driven thereby; actuating means rotatable in synchronism with said driving means; and follower means coupled to said first rotating member and biased against said driving means by the rotation force of said first rotating member so as to follow said driving means; whereby when the tape stops, said follower means remains out of engagement with said driving means while said second rotating member continues its rotation, and said actuating means engages with said follower means.

2. The combination as claimed in claim 1 wherein said follower means is movable from a first position in which said follower means follows said driving means to a second position in which follower means is coupled to the tape recorder to bring the tape recorder to a stop condition, whereby when said first rotating member stops its rotation upon the termination of the movement of the tape the tape recorder is stopped.

3. The combination as claimed in claim 1, wherein said first rotating member is a reel roller, and said actuating means engages with said follower means when said reel roller stops its rotation.

4. The combination as claimed in claim 1, wherein said second rotating member is a flywheel upon which said driving means and said actuating means are mounted.

5. In a tape recorder, the combination comprising: a pair of reel rollers; a motor; a flywheel driven by said motor; a capstan mounted on said flywheel; a pressure roller movable into and out of engagement with said capstan to drive a tape; a driving element mounted on said flywheel; an actuating element mounted on said flywheel adjacent to said driving element; a friction roller engaged with and rotating with one of said reel rollers; and a follower member operatively coupled with said friction roller and biased against said driving element by rotation force of said friction roller; said driving element imparting an oscillatory movement to said follower member and said follower member remaining out of engagement with said driving element when said reel roller stops its rotation upon the termination of the movement of the tape, and said actuating element engages with said follower member.

6. The combination as claimed in claim 5 wherein said follower member is movable from a first position to a second position by said actuating element when said reel roller stops its rotation upon the termination of the movement of the tape, said follower member at said second position being coupled to said pressure roller to move said pressure roller out of engagement with said capstan.